United States Patent [19]
Kindred

[11] Patent Number: 5,552,377
[45] Date of Patent: Sep. 3, 1996

[54] MUD SWEEP AND SPACER COMPOSITION

[76] Inventor: Jack E. Kindred, 605 Green Ct., Athens, Tex. 75751

[21] Appl. No.: 49,945

[22] Filed: Apr. 20, 1993

[51] Int. Cl.$^6$ .............................. E21B 33/06; E21B 33/16; E21B 43/00

[52] U.S. Cl. .......................... 507/209; 507/216; 507/213; 507/260; 507/266; 507/269; 507/925; 507/926

[58] Field of Search .......................... 252/8.551; 507/203, 507/209, 216, 213, 260, 266, 269

[56] References Cited

U.S. PATENT DOCUMENTS

| | | |
|---|---|---|
| 3,070,162 | 12/1962 | Barnard, Jr. . |
| 3,122,203 | 2/1964 | Hawkins . |
| 3,799,874 | 3/1974 | Parker . |
| 3,849,316 | 11/1974 | Motley et al. . |
| 3,850,248 | 11/1974 | Carney . |
| 3,920,559 | 11/1975 | Elting . |
| 4,141,843 | 2/1979 | Watson . |
| 4,190,110 | 2/1980 | Beirute . |
| 4,217,229 | 8/1980 | Watson . |
| 4,276,182 | 6/1981 | Beirute . |
| 4,304,300 | 12/1981 | Watson . |
| 4,423,781 | 1/1984 | Thomas . |
| 4,456,537 | 6/1984 | Oliver, Jr. et al. . |
| 4,566,977 | 1/1986 | Hatfield . |
| 4,646,834 | 3/1987 | Bannister . |
| 4,670,164 | 6/1987 | Watson et al. . |
| 4,681,165 | 7/1987 | Bannister . |
| 4,717,488 | 1/1988 | Seheult et al. . |
| 4,780,220 | 10/1988 | Peterson . |
| 5,030,366 | 7/1991 | Wilson et al. . |
| 5,101,902 | 4/1992 | Parcevaux et al. . |
| 5,113,943 | 5/1992 | Wilson et al. . |
| 5,221,489 | 6/1993 | Bloys et al. . |
| 5,287,929 | 2/1994 | Bloys et al. . |
| 5,306,340 | 4/1994 | Donche et al. . |

Primary Examiner—Shean C. Wu
Assistant Examiner—Joseph D. Anthony
Attorney, Agent, or Firm—Hitt Chwang & Gaines, P.C.

[57] ABSTRACT

A composition, especially suitable for use as a mud sweep and a spacer. The composition includes a petroleum-based hydrocarbon, a biopolymer, a thickening agent, a surfactant and potassium chloride. Other optional ingredients in embodiments of the present invention include a lower alkanol, sodium salts and aluminum stearate.

11 Claims, No Drawings

MUD SWEEP AND SPACER COMPOSITION

BACKGROUND OF THE INVENTION

The present invention relates to compositions used both as mud sweeps and spacers to facilitate oil field production operations.

Various "drilling fluids" have been developed to facilitate oil field production operations. Certain drilling fluids are circulated through the bit, an integral part of rotary drilling, to carry cuttings from the bit. Drilling fluids wherein the fluid phase is oil, water or a combination thereof, are known to those skilled in the art as "drilling mud" or, simply, "mud." In addition to functioning to bring cuttings to the surface, mud lubricates and cools the drill stem and bit, deposits a mud cake on the wall of the borehole to prevent loss of fluids to the formation, and protects against blowouts by holding back subsurface pressures. Although mud was originally a suspension of earth solids (e.g., clays) in water, the mud used in modern drilling is a complex, multiphase mixture of liquids, reactive solids, and inert solids. The liquid phase may be crude oil, diesel oil, or water and may contain one or more conditioners.

Yet another aspect of oil field production upon which the present invention has an impact is the aspect of "cementing." Cement is a powder consisting of alumina, silica, lime and other substances which hardens when mixed with water. Cementing, in the oil field production area, is the process of pumping a cementitious slurry into a wellbore to perform various functions. Those functions include supporting casing by bonding the casing to the walls of the wellbore, isolating different zones in the well, protecting the pipe from corrosive fluids, protecting fresh water sands, and sealing perforations in casing. Common operations, involving cement, include "plug backing" and "squeeze cementing." To "plug back" is to fill part of a wellbore with cement, e.g., for side-tracking; that is, for drilling past an obstacle which has become permanently lodged in the hole. "Squeeze cementing" is the process of forcing cementing material under pressure into a specific portion of a well, such as openings, fractures or permeable zones.

Interaction of different types of mud, as well as interaction of mud and cement, can cause problems in the oil well environment. For example, mixing of water base muds and oil base muds can have a deleterious effect on the properties of each. Certain mud components have been known to become mixed with cement slurry during displacement processes, which has an adverse effect on the properties of the cement. Slaked cement contains about 62.5 percent of calcium hydroxide, which is a major source of trouble when cement contaminates drilling fluids. In addition to the above, outside factors, such as bromides and saltwater, can adversely affect mud and/or cement, especially water base mud.

Interaction of different types of mud and/or mud cement can occur during several oil field operations. Mud must, for example, be swept out of a well prior to primary cementing. If not completely swept away, and the combination of mud and cement slurry is incompatible, stringers of gelled mud fingering through the cement or adhering to the casing may result. This can adversely affect bonding of the cement. In any event, "flushing" with mud sweep prior to cementing is well appreciated by those skilled in the art as helping to control fluid loss and alleviating lost circulation during cementing. These later advantages result from the fact that mud sweeps, in a stiff gel form, seal off lost circulation zones by blocking flow channels and fractures. This causes higher fill-up efficiency and allows a higher top of cement. Additionally, downhold fluid loss is minimized. In general, a mud sweep should prevent cement flocculation, increase mud viscosity, and enable turbulent flow regimes at low pump rates.

Spacers are presweep fluids that can be weighted or densified to control hydrostatic pressure. Both viscous spacers which operate in the plug flow regime and turbulent spacers, which can combine high displacement rates with the ability to control densities, are known.

In the past, spacer fluids could not be successfully used as mud sweeps because they were not designed to protect soft shales. In addition, they did not contain the detergents necessary to remove sufficient oil and hydrocarbons from inside the casing to meet environmental standards.

U.S. Pat. No. 4,566,977 to Hatfield and entitled "Non-Aqueous Slurries Used as Thickeners" describes a non-aqueous slurry for use as a viscosifier in oil field drilling. The described slurry comprises a water-soluble cellulose ether polymer, a water-insoluble liquid hydrocarbon, a nonionic surfactant with a hydrophilic-lipophilic balance of 7 to 14, and an organo-modified clay.

U.S. Pat. No. 4,670,164 to Watson et al. and entitled "Liquid Polymer Containing Compositions For Thickening Aqueous Systems" describes a composition useful as a thickening agent for aqueous systems used in well drilling and treatment. The described composition contains hydroxyethyl cellulose (HEC), a liquid hydrocarbon which does not cause significant swelling of HEC, and an organophilic clay. In addition, the composition may also contain an optional liquid, low molecular weight polar organic compound (e.g. lower alcohols or ketones) and a degellant to control the viscosity of the composition (e.g., fatty acids, or polyalkylene glycols).

U.S. Pat. No. 4,717,488 to Seheult et al. and entitled "Spacer Fluid" describes a slurry that can be used to prepare a spacer fluid for oil field use. The described spacer fluid consist of heteropolysaccharide S-130 (i.e., Biozan™ manufactured by Merck & Co., Inc.), an organophilic clay, a hydrocarbon solvent, an ethoxylated nonylphenol surfactant, and an optional lower alkanol.

The three patents mentioned above (i.e., U.S. Pat. Nos. 4,566,977; 4,670,164; and 4,717,488) describe compositions useful in oil field applications. However, not one of the described compositions is as advantageous in facilitating oil field production operations as the present invention. For example, Watson et al.'s composition does not contain a surfactant, which is essential to sufficiently clean the well casing of oil and hydrocarbons in order to meet environmental standards.

Furthermore, not one of the patented compositions described above contains potassium chloride. The inclusion of potassium chloride significantly improves the stability of the composition and prevents the hydration of "fines" (i.e., smaller clay or shale particles) and the consequent thickening of the composition. In addition, preventing shale hydration operates to protect soft shales and facilitates hole cleaning in severely washed out holes.

In fact, despite numerous efforts to develop an optimal composition that can serve as both a mud sweep and a spacer, no composition to date has been completely successful.

Based on the foregoing, a need has arisen for a composition that can serve as both a spacer and a mud sweep. Such a composition must be capable of separating cement from drilling fluids, separating water base muds from bromides, separating oil base muds from water base muds, and lessening the chance of contamination during plugging and squeezing operations. Important properties of such mud sweeps and spacers are high viscosity (even at high temperatures), excellent suspension (even at high temperatures), thickening efficiency in many different waters, high shear thinning and stability to salts, pH, and shear. Mud sweeps must also be effective in facilitating hole cleaning (even when the hole is severely washed out) and cement bonding (which improves chances for a successful cement job).

SUMMARY OF THE INVENTION

According to the teachings of the present invention, a composition, especially suitable for use as a mud sweep and as a spacer, includes a petroleum-based hydrocarbon, a biopolymer, a thickening agent, a surfactant and a halide of an alkali metal.

Accordingly, it is an object of the present invention to provide a composition that can be used as both a mud sweep and a spacer.

Another object of the present invention is to provide a mud sweep having excellent viscosity characteristics that can stabilize soft shales.

Yet another object of the present invention is to provide an oil escapulated or coated polysaccharide which is readily hydratable when introduced to water or other brine solutions, thus allowing the biopolymer to hydrate as individual particles rather than in clusters commonly referred to as "fisheyes."

Still yet another object is to provide a mud sweep and spacer having excellent suspension properties even at high temperatures.

A further object of the present invention is to provide a mud sweep and spacer having thickening efficiency in many different waters.

A yet further object of the present invention is to provide a pseudoplastic polymer solution.

Still yet a further object of the present invention is to provide a mud sweep and spacer that is stable to salts, pH and shear.

Yet even another object of the present invention is to provide a mud sweep and spacer that is easy to use and compactly transportable, because it comes in concentrated form in a few pails rather than in dry form in a large number of sacks.

Still yet another object of the present invention is to provide a composition with enough detergent or surfactant activity to effectively clean a well hole, but that will have relatively little foaming when mixed with water or brine to form a mud sweep spacer.

Other objects, advantages and novel features of the present invention will become apparent from the following detailed description of the invention.

DETAILED DESCRIPTION OF THE INVENTION

The present invention comprises a number of ingredients or elements, of which the major ingredients are discussed in detail below, which combine to form a remarkably effective mud sweep and spacer. This mud sweep and spacer has a number of outstanding characteristics, discussed below.

Broadly, one embodiment of the present invention includes a petroleum-based hydrocarbon, a biopolymer, a thickening agent, a surfactant/catalyst, and a halide of an alkali metal. A preferred embodiment of the composition in the present invention is formed of about 64.5 weight percent of mineral seal oil, 22 weight percent of hexeropolysaccaride, 6 weight percent of an organophilic clay, 2 weight percent of a non-ionic surfactant, 0.5 weight percent of potassium chloride, 1.5 percent of sodium carbonate, 0.5 weight percent of sodium silicate, 2 weight percent of isopropanol, 0.5 weight percent of aluminum stearate and 0.5 weight percent of sodium bicarbonate. Each of the various ingredients or elements of this preferred embodiment of the present invention are discussed in individual paragraphs immediately below.

A first ingredient of the present invention is a petroleum-based hydrocarbon. Suitable petroleum-based hydrocarbons in the present invention include non-polar hydrophilic liquids. Exemplary hydrophilic liquids include kerosene, mineral seal oil, and diesel oil. The petroleum-based hydrocarbon will be included in the present invention in amounts from about 25 to about 70 percent by weight, based on the total weight of the composition, and preferably from about 60 to 68 percent by weight, based on the total weight of the composition. In a preferred embodiment of the present invention, a high molecular weight, slightly anionic biopolymer manufactured by Kelco Rotary of Tulsa, Okla. (Biozan™), is combined with a light mineral oil.

A second ingredient of the present invention is a biopolymer, preferably in a particulate form. Various products of wellum gum, e.g. polysaccharides, are suitable biopolymers for use in the present invention. Polysaccharides, in conjunction with the other ingredients of the present invention, form a stable hydrosuspension which remains uniform and fluid, even during long-term storage under various weather conditions. In addition, since polysaccharides are water soluble polymers they can be dissolved evenly and efficiently when dispersed in aqueous solutions. An ideal polysaccharide employed in the present invention will produce (with the other elements forming the invented composition) a high viscosity sheer thinning fluid. Sheer thinning, i.e. the characteristic of decreasing the fluid's viscosity with increasing sheer rates and immediately reverting back to a higher viscosity when sheer is reduced, is a desirable characteristic of mud sweeps and spacers. Another desirable characteristic of mud sweeps and spacers is a high viscosity sheer thinning fluid that will retain a large measure of its viscosity at high temperatures. This is particularly important in deep wells where high temperatures are commonly encountered. Furthermore, resistance to heat degradation enhances the carrying capacity, the stability of the suspension, and the hole cleaning ability of the resultant composition. A polysaccharide that has proven to be very effective in a composition according to the present invention is a high molecular weight, slightly anionic biopolymer manufactured by Kelco Rotary of Tulsa, Okla., (Biozan™). Biozan™, or other biopolymer, will be included in the present invention in amounts from about 20 to 65 percent by weight, based on the total weight of the composition, and preferably from about 22 to 30 percent by weight, based on the total weight of the composition.

A third ingredient of the present invention is a thickening agent. Various desired applications of a mud sweep and spacer, discussed above, require a fluid somewhat thicker than simply oil and suspended biopolymer. Thus a thickening agent, such as an organophilic clay or bentonite, is included in embodiments of the present invention. The organophilic clay is beneficial in stabilizing the suspension of biopolymer in the hydrocarbon carrier. In addition, a preferred embodiment of the present invention, set forth as Example I below, includes bentonite as a thickening agent. Bentonite is well known in the art as a montmorillonite-containing clay or a treated montmorillonite-containing clay having strong colloidal properties. An organophilic clay product that has proven to be quite effective in a composition as set forth in Example II is Geltone II, a product of the Barold Company of Houston, Tex. Geltone II, or other thickening agent, will be included in the present invention in amounts from about 0.3 to 8 percent by weight, based on the total weight of the composition, and preferably from about 2 to 7 percent by weight, based on the total weight of the composition.

A fourth ingredient of the present invention is a surfactant, i.e., a surface active agent. The inclusion of a surfactant is essential to the present invention to achieve a completely uniform dispersion of the biopolymer in the petroleum-based hydrocarbon. Various products, well known to those skilled in the art, are offered for sale as drilling mud surfactants. A preferred embodiment of the present invention, set forth below, includes as a surfactant an ethoylated nonylphenol comprising $(C_2H_4O)_nC_{15}H_{24}O$ sold by Montello, Tulsa, Okla. as HME™. HME™ is a superior surfactant in the present invention for several reasons. First of all, HME™, as opposed to other surfactants used in prior art products, contributes to reducing the rheological properties of the composition and thus allows the described mud sweep to go into turbulent flow at lower pump rates. Secondly, HME™ is a superb surface tension reducer and can enhance the stabilization of the suspension of the biopolymer in mineral oil even at increased temperatures. Thirdly, HME™ is a superior surfactant in that it is relatively non-foaming during mixing of the composition. Finally, HME™ maximizes the effectiveness of the other additives of the composition by optimizing their exposure to the petroleum-based hydrocarbons in the fluid phase. HME™, or other surfactant, will be included in the present invention in amounts from about 0.1 to 6 percent by weight, based on the total weight of the composition, and preferably from about 3.5 to 5 percent by weight, based on the total weight of the composition.

A fifth ingredient of the present invention is a halide of an alkali metal, preferably potassium chloride. The inclusion of potassium chloride improves the stability of the clay suspension within the bore hole at higher shear rates and at a variety of pH's. Furthermore, an essential function of the potassium chloride in the present invention is to stabilize soft shales. The inclusion of potassium chloride in the described composition prevents the shales from swelling or reacting with water. Potassium chloride will be included in the present invention in amounts from about 0.1 to 2 percent by weight, based on the total weight of the composition, and preferably from about 0.5 to 1.5 percent by weight, based on the total weight of the composition.

An optional ingredient of a composition according to the present invention is a mixture of sodium silicate and sodium carbonate, which can be obtained from commercial product Spic and Span®, manufactured by Proctor & Gamble, Cincinnati, Ohio. The inclusion of these sodium salts has proven advantageous in certain embodiments of the present invention, particularly when the composition is used as a mud sweep, and may be essential if the mud sweep is to effectively remove sufficient quantities of residual petroleum hydrocarbons, remaining after the use of an oil-based mud or drilling fluid, to meet environmental standards. Preferred sodium salts for the described composition consists of from about 0.5 to 3 weight percent, based on the total weight of the composition of sodium silicate and sodium carbonate. The most preferred embodiment of the composition includes about 1.5 weight percent, based on the total weight of the composition, of sodium carbonate and 0.5 weight percent, based on the total weight of the composition, of sodium silicate.

Another optional ingredient of a composition according to the present invention is a lower alkanol, such as an alcohol with one to three carbon. A preferred embodiment of the present invention, set forth in Example II below, includes isopropanol as the lower alkanol. Alcohol has proven to be a valuable ingredient in certain embodiments of the present invention because it can act as a dispersant and enhance the stability of the suspension. Alcohol can also, in conjunction with the surfactant, act as a bactericide to control the biological degradation of the biopolymer. A lower alkanol can be effectively used in the present invention in amounts from about 0 to 6 percent by weight, based on the total weight of the composition.

Yet another optional ingredient of a composition according to the present invention is aluminum stearate. The inclusion of aluminum stearate has proven to be valuable as a defoamer. When adding barite or other weight materials to mud sweeps or spacers, it is extremely important to include a defoamer so that all of the ingredients can be accurately weighed. This is particularly important for mud sweeps and spacers that contain surfactants, or other materials that commonly foam with mixing. For example, the difference in the apparent weight of a solution with extensive foaming and the same solution with reduced foaming can amount to as much as 1.5 pounds per gallon of mud sweep or spacer. Aluminum stearate is present in the described composition at 0.5 weight percent, based on the total weight of the composition.

Still another optional ingredient of a composition according to the present invention is sodium bicarbonate. Sodium bicarbonate is particularly useful in preventing cement contamination in mud sweeps. For example, the inclusion of sodium bicarbonate in the composition can prevent the detrimental formation of stringers of gelled mud fingering through the cement. Sodium bicarbonate is included in the present invention in amounts from about 0.2 to about 1.0 weight percent, based on the total weight of the composition. The most preferred embodiment of the composition includes about 0.5 weight percent, based on the total weight of the composition.

The composition described herein is especially suitable for use in preparing a mud sweep and cement spacer. When pumped between drilling fluids and cement the composition keeps the drilling fluids (mud) from being contaminated by the cement and the cement from being contaminated by the mud. This results in a better cementing operation. Additionally, the composition cleans the well bore which provides better bonding. Other applications for which the composition is well suited include separating water base muds from brine solutions, separating water base drilling fluids from oil base drilling fluids, and sweeping holes to remove gas accumulation (especially in washed out portions of a bore hole and larger diameter casings and risers).

With regard to general performance of the mud sweep and spacer described herein, the composition behaves in a superior manner because of its unique viscosity characteristics; specifically, pseudoplasticity (high viscosity at low shear rates and low viscosity at high shear rates) which provides a high annular viscosity for optimum displacement and suspension, and excellent viscosity retention up to 350° F. After considerable experimentation and field work, it can be concluded that, in most drilling, workover and completion operations, turbulent flow (which, under many circumstances, has the highest displacement efficiency) is not possible because of pump and pipe limitations, exceeding formation breakdown pressure, hole erosion, and other considerations. It has also been concluded that the above reasons dictate laminar or plug flow circulation of the fluids. The displacement efficiency of the present invention with laminar flow in eccentric annuli is very high because of the theological properties displayed by the composition of the present invention.

With regard to suspension, the composition according to the present invention has been found to be an excellent suspension agent. Whether the solids are cuttings, bridging particles, weighting material, frac, sand or gravel for packs, the composition according to the present invention has been found to suspend far better than other oil field polymers. High temperature has little adverse effect on the composition according to the present invention. At 175° F. one lb of composition/bbl water of the present invention has been found to suspend 10–20 mesh sand longer than twice the concentration (i.e., 2 lb of composition/bbl water) of certain prior art products.

As previously mentioned, the composition of the present invention comes in concentrated form, conveniently transportable in pails. This is a tremendous advance over prior art products, which generally come in a large number of sacks that must be kept dry during their transport (particularly ocean transport). The composition of the present invention can also be conveniently mixed as described below. Mixing can be performed in rig cementing units in 20 bbl volumes, in a slugging pit, or in a number of other convenient ways.

The invention is further defined by reference to the following examples, which are intended to be illustrative and not limiting.

|  | % by weight |
| --- | --- |
| EXAMPLE I | |
| Mineral seal oil | 64.5 |
| Hydroxyethylcellulose | 22.0 |
| Bentonite | 6.0 |
| HME ™ | 4.0 |
| Aluminum stearate | 0.5 |
| KCl | 0.5 |
| Sodium silicate | 0.5 |
| Sodium carbonate | 1.5 |
| Sodium bicarbonate | 0.5 |
| EXAMPLE II | |
| Mineral seal oil | 64.5 |
| Biozan ™ | 22.0 |
| Geltone II | 6.0 |
| HME ™ | 2.0 |
| Aluminum stearate | 0.5 |
| KCl | 0.5 |
| Sodium silicate | 0.5 |
| Sodium carbonate | 1.5 |
| Isopropanol | 2.0 |
| Sodium bicarbonate | 0.5 |

The above elements were prepared by mixing the ingredients as follows:

The mineral oil was placed in a tank. A high volume, high pressure pump was situated and operated so as to agitate the mineral oil.

The Geltone II was then added to thicken the mineral oil. HME™ was added to aid in the further thickening of the slurry.

The isopropanol was then added.

When a satisfactory viscosity was reached, the Biozan™ and other ingredients were added and blended until the entire composition was uniformly smooth.

The above-described mix could be packaged in seven 6-gallon pails which are ideally suited for transport to and use at the oil field. Preparation of the mud sweep and spacer was accomplished by adding and mixing the composition with water such that the mud sweep or spacer fluid contained about 0.25 to 2.5 lb composition/bbl water (0.113–1.13 Kg composition/158.98 l water).

Regarding oil field applications of the above, preparation of a 20-barrel (bbls) sweep, three pails of the composition prepared according to Example II can be mixed with 20 bbls water; for a 30 bbls sweep, five pails of the composition prepared according to Example II can be mixed with 30 bbls water, and for a 40 bbls sweep, seven pails of the composition prepared according to Example II, can be mixed with 40 bbls of water. As well known to those skilled in the art, the resultant sweep may be weighted to a desired weight with barite.

Numerous modifications and variations are possible in light of the above teachings. It is therefore to be understood that within the scope of the appended claims, the invention may be practiced otherwise than as specifically described.

What is claimed is:

1. A composition for the preparation of a mud sweep and spacer, the composition consisting of:

from about 25 to about 70 weight percent, based on total weight of the composition, of a petroleum-based hydrocarbon;

from about 20 to about 65 weight percent, based on total weight of the composition, of a biopolymer;

from about 0.3 to about 8 weight percent, based on total weight of the composition, of a thickening agent selected from the group consisting of organophilic clay and bentonite;

from about 0.1 to about 6 weight percent, based on total weight of the composition of a surfactant;

from about 0.1 to about 2 weight percent, based on total weight of the composition, of a halide of an alkali metal;

from about 1 to about 6 weight percent, based on total weight of the composition, of a lower alkanol;

from about 0.3 to about 5 weight percent, based on total weight of the composition, of sodium silicate and sodium carbonate; and from about 0.1 to about 1 weight percent, based on total weight of the composition, of a defoamer.

2. The composition as recited in claim 1, wherein the petroleum-based hydrocarbon is selected from the group consisting of mineral oil, mineral seal oil, kerosene, and diesel oil.

3. The composition as recited in claim 1, wherein the biopolymer is selected from the group consisting of hydroxyethylcellulose and polysaccharides.

4. The composition as recited in claim 1, wherein the surfactant is an ethoxylated nonylphenol.

5. The composition as recited in claim 1, wherein the lower alkanol is isopropanol.

6. The composition as recited in claim 1, wherein said defoamer is aluminum stearate.

7. The composition as recited in claim 1, where the halide of an alkali metal is potassium chloride.

8. The composition as recited in claim 1, wherein the biopolymer is selected from the group consisting of xanthum gum, wellum gum and guargum.

9. A process for preparing a mud sweep and spacer which comprises adding and mixing the composition of claim 1 to water such that the mud sweep or spacer fluid contains 0.25 to 2.5 lb composition/bbl water, equivalent to 0.113–1.13 Kg composition/158.98 1 1 water, of biopolymer.

10. A composition for the preparation of a mud sweep and spacer, the composition consisting essentially of:
- from about 60 to about 68 weight percent, based on total weight of the composition, of a mineral seal oil;
- from about 22 to about 30 weight percent, based on total weight of the composition, of a heteropolysaccharide;
- from about 2 to about 7 weight percent, based on total weight of the composition, of an organophilic clay;
- from about 3.5 to about 5 weight percent, based on total weight of the composition, of an ethoxylated nonylphenol;
- from about 0.5 to about 1.5 weight percent, based on total weight of the composition, of potassium chloride;
- from about 1 to about 6 weight percent, based on total weight of the composition, of isopropanol;
- from about 0.5 to about 3 weight percent, based on total weight of the composition, of sodium silicate and sodium carbonate;
- from about 0.3 to about 0.5 weight percent, based on total weight of the composition, of aluminum stearate; and
- from about 0.5 to about 1.0 weight percent, based on total weight of the composition, of sodium bicarbonate.

11. A composition for the preparation of a mud sweep and spacer, the composition comprising:
- about 64.5 weight percent, based on total weight of the composition, of a mineral seal oil;
- about 22 weight percent, based on total weight of the composition, of a heteropolysaccharide;
- about 6 weight percent, based on total weight of the composition, of an organophilic clay;
- about 2.0 weight percent, based on total weight of the composition, of an ethoxylated nonylphenol;
- about 0.5 weight percent, based on total weight of the composition, of potassium chloride;
- about 0.5 weight percent, based on total weight of the composition, of sodium silicate;
- about 1.5 weight percent, based on total weight of the composition, of sodium carbonate;
- about 2.0 weight percent, based on total weight of the composition, of isopropanol;
- about 0.5 weight percent, based on total weight of the composition, of aluminum stearate; and
- about 0.5 weight percent, based on total weight of the composition, of sodium bicarbonate.

* * * * *

UNITED STATES PATENT AND TRADEMARK OFFICE
CERTIFICATE OF CORRECTION

PATENT NO. : 5,552,377
DATED      : September 3, 1996
INVENTOR(S): Jack E. Kindred It is certified that error appears in the above-indentified patent and that said Letters Patent is hereby corrected as shown below:

Col. 5, line 10, "Barold" should be --Baroid--.

Col. 7, line 13, "theological" should be --rheological--.

Signed and Sealed this

Nineteenth Day of November, 1996

*Attest:*

BRUCE LEHMAN

*Attesting Officer*     Commissioner of Patents and Trademarks